(12) United States Patent
Claytor (10) Patent No.: US 9,116,037 B2
(45) Date of Patent: Aug. 25, 2015

(54) PASSIVE INFRARED DETECTOR

(75) Inventor: Richard N. Claytor, Ft. Worth, TX (US)

(73) Assignee: Fresnel Technologies, Inc., Ft. Worth, TX (US)

( * ) Notice: Subject to any disclaimer, the term of this patent is extended or adjusted under 35 U.S.C. 154(b) by 1085 days.

(21) Appl. No.: 11/974,425

(22) Filed: Oct. 12, 2007

(65) Prior Publication Data

US 2011/0155911 A1 Jun. 30, 2011

Related U.S. Application Data (60) Provisional application No. 60/851,659, filed on Oct. 13, 2006.

(51) Int. Cl.
*G01J 5/08* (2006.01)
*G01J 1/06* (2006.01)
*G01J 5/34* (2006.01)
*G08B 13/193* (2006.01)

(52) U.S. Cl.
CPC .... *G01J 5/08* (2013.01); *G01J 1/06* (2013.01); *G01J 5/0803* (2013.01); *G01J 5/0806* (2013.01); *G01J 5/0831* (2013.01); *G01J 5/34* (2013.01); *G08B 13/193* (2013.01)

(58) Field of Classification Search
CPC ............. G01J 5/00; G01J 5/0022; G01J 5/06; G01J 5/0806; G01J 5/0809; G01J 5/0878; G01J 5/34; G01J 5/345
USPC ....................................................... 250/338.3
See application file for complete search history.

(56) References Cited

U.S. PATENT DOCUMENTS

| | | | | |
|---|---|---|---|---|
| 3,387,139 A | * | 6/1968 | Gerard et al. | 250/237 R |
| 4,442,359 A | * | 4/1984 | Lederer | 250/342 |
| 4,523,095 A | | 6/1985 | Keller-Steinbach | |
| 4,538,062 A | * | 8/1985 | Shishido | 250/201.4 |
| 4,640,627 A | * | 2/1987 | Tracy et al. | 374/121 |
| 4,717,821 A | * | 1/1988 | Messiou | 250/221 |
| 4,772,797 A | * | 9/1988 | Kahl et al. | 250/353 |
| 4,868,391 A | * | 9/1989 | Messiou | 250/353 |
| 4,933,560 A | * | 6/1990 | Messiou et al. | 250/353 |
| 5,015,857 A | * | 5/1991 | Bross et al. | 250/349 |
| 5,026,990 A | | 6/1991 | Marman et al. | |
| 5,045,702 A | * | 9/1991 | Mulleer | 250/342 |
| 5,106,201 A | * | 4/1992 | Neuhaus | 374/131 |
| 5,209,570 A | * | 5/1993 | Neuhaus | 374/131 |
| 5,227,632 A | * | 7/1993 | Armstrong et al. | 250/353 |
| 5,393,978 A | | 2/1995 | Schwarz | |

(Continued)

FOREIGN PATENT DOCUMENTS

JP 63195531 A * 8/1988
JP 63293426 A * 11/1988

OTHER PUBLICATIONS

JP 63293426 A Translation.*

(Continued)

*Primary Examiner* — David Porta
*Assistant Examiner* — Djura Malevic
(74) *Attorney, Agent, or Firm* — John A. Fortkort; Fortkort & Houston P.C.

(57) ABSTRACT

An infrared detector (301) is provided which comprises a pyroelectric detector (303) having first and second sensing elements (345), an aperture stop (311), and a Fresnel lens array (305). The detector may be used as a passive infrared sensor unit for detecting intrusion into large openings.

26 Claims, 11 Drawing Sheets

(56) References Cited

U.S. PATENT DOCUMENTS

| | | | |
|---|---|---|---|
| 5,414,255 A | 5/1995 | Hampson | |
| 5,479,292 A * | 12/1995 | Yoshikawa et al. | 359/355 |
| 5,567,941 A * | 10/1996 | Fujikawa et al. | 250/353 |
| 5,567,942 A * | 10/1996 | Lee et al. | 250/353 |
| RE35,534 E | 6/1997 | Claytor | |
| 5,637,040 A * | 6/1997 | Kim et al. | 454/256 |
| 5,677,529 A | 10/1997 | Hofmann et al. | |
| 5,717,203 A | 2/1998 | Yung | |
| 5,796,514 A * | 8/1998 | Chipper | 359/354 |
| 5,818,337 A * | 10/1998 | Erismann | 340/567 |
| 5,844,240 A * | 12/1998 | Lee et al. | 250/342 |
| 5,852,516 A * | 12/1998 | Chipper | 359/676 |
| 5,886,821 A * | 3/1999 | Sohn | 359/619 |
| 5,973,594 A | 10/1999 | Baldwin et al. | |
| 6,037,594 A * | 3/2000 | Claytor et al. | 250/353 |
| 6,133,569 A * | 10/2000 | Shoda et al. | 250/332 |
| 6,215,398 B1 | 4/2001 | Platner et al. | |
| 6,222,191 B1 | 4/2001 | Myron et al. | |
| 6,288,395 B1 | 9/2001 | Kuhnly et al. | |
| 6,317,040 B1 | 11/2001 | Ikeda | |
| 6,317,049 B1 | 11/2001 | Toubia et al. | |
| 6,324,008 B1 * | 11/2001 | Baldwin et al. | 359/619 |
| 6,376,840 B1 | 4/2002 | Ko | |
| 6,414,314 B1 | 7/2002 | Ikeda | |
| 6,747,275 B2 | 6/2004 | Raper et al. | |
| 6,881,957 B2 | 4/2005 | Dougherty et al. | |
| 6,992,577 B2 | 1/2006 | Tsuji et al. | |
| 7,045,764 B2 | 5/2006 | Beggs et al. | |
| 7,079,028 B2 | 7/2006 | Herrmann et al. | |
| 7,187,505 B2 | 3/2007 | Claytor | |
| 7,321,425 B2 * | 1/2008 | Haran | 356/326 |
| 7,813,055 B2 * | 10/2010 | Yasumoto et al. | 359/742 |
| 8,063,375 B2 * | 11/2011 | Cobbinah et al. | 250/353 |
| 2001/0015409 A1 | 8/2001 | Mahler et al. | |
| 2002/0175285 A1 * | 11/2002 | Ito et al. | 250/338.3 |
| 2003/0080296 A1 | 5/2003 | Raper et al. | |
| 2003/0090371 A1 * | 5/2003 | Teowee et al. | 340/426.24 |
| 2004/0129883 A1 | 7/2004 | Dougherty et al. | |
| 2004/0140430 A1 | 7/2004 | Micko | |
| 2004/0169145 A1 | 9/2004 | Micko | |
| 2005/0062601 A1 | 3/2005 | Tsuji et al. | |
| 2005/0184869 A1 | 8/2005 | Micko | |
| 2005/0200473 A1 | 9/2005 | Noguchi et al. | |
| 2005/0205790 A1 | 9/2005 | Noguchi | |
| 2005/0211899 A1 | 9/2005 | Noguchi | |
| 2005/0236572 A1 | 10/2005 | Micko | |
| 2006/0025897 A1 | 2/2006 | Shostak et al. | |
| 2006/0164233 A1 | 7/2006 | Meng et al. | |
| 2007/0152156 A1 * | 7/2007 | Zhevelev et al. | 250/339.14 |
| 2008/0087824 A1 * | 4/2008 | Hayashi et al. | 250/338.1 |
| 2009/0146063 A1 * | 6/2009 | Zhevelev et al. | 250/349 |

OTHER PUBLICATIONS

JP 63195531 A Translation.*

Intruder Detectors; www.optex.co.jp/e/sec/intruder/bx80n.html; PIR for Outdoor BX-80N; Jul. 24, 2006; 3 pages.

PerkinElmer optoelectronics; Sensors, Motion Detection Applications; "Pyroelectric Detector LHi 874/878 Dual ELement configuration including FET and optical window"; www.perkinelmer.com/opto; Datasheet; 2003; 1 page.

* cited by examiner

PASSIVE INFRARED DETECTOR

CROSS-REFERENCE TO RELATED APPLICATION

This application claims the benefit of priority to U.S. Provisional Application No. 60/851,659, filed Oct. 13, 2006, having the same title, and the same inventor, and which application is incorporated herein by reference in its entirety.

FIELD OF THE DISCLOSURE

The present disclosure relates generally to passive thermal infrared devices, and more particularly to passive infrared detectors with configurations leading to narrow fields of view.

BACKGROUND OF THE DISCLOSURE

Infrared detectors have become ubiquitous in the security industry, due to the several advantages these detectors offer over competing systems. In particular, because the energy being detected is emitted heat rather than reflected light, such detectors are suitable for both daytime and nighttime operations. Also, because infrared wavelengths are much longer than visible wavelengths of light, infrared detectors can detect through dust, smoke, clouds, haze, and light rain. Infrared detectors are also highly sensitive, and are generally capable of detecting temperature variations of a fraction of a degree centigrade. In addition, because they operate outside of the visible region of the spectrum, infrared detectors are completely passive and non-intrusive.

Passive infrared (PIR) detectors are a type of infrared detector commonly used in security systems. PIR detectors commonly consist of a housing containing optics to focus thermal infrared energy, a pyroelectric detector onto which the optics focus, and circuitry that can amplify and process the electrical signal from the pyroelectric detector. A simple configuration is a single cylindrical lens in front of a dual-element pyroelectric detector. This configuration leads to a broad, double vertical barrier, with the width of the barrier dependent on the width and spacing of the elements in the detector and on the focal length of the lens.

While this approach can address security against, for instance, attempts to enter a window or to cross a barrier in front of an artwork, it does not address nuisance alarms associated with such security requirements. For example, in some installations of motion detectors, the detector is required to sense motion across a window, storefront or other opening which may be situated adjacent to a busy sidewalk or street. In such installations, if the angular range covered by the detector (that is, the angle of coverage measured perpendicularly to a major plane of coverage) is overly broad, the detector may sense unintended targets, such as innocent passersby or normal street traffic. Even if the coverage area of the detector is tilted toward the window in order to reduce the portion of the coverage area overlapping the public areas, reflections from the window glass of thermal energy from passersby or traffic can be detected, and nuisance alarms may result.

In order to minimize such nuisance alarms, detectors in such installations can be configured with a very long focal length. Since the angular range covered by the detector decreases with increasing focal length (the tangent of the angle of coverage is given by dividing the dimensions of the pyroelectric detector by the focal length of the lens), this approach causes the image of the detector elements to be very narrow, and hence establishes a very narrow sheet of protection in front of the opening to be protected. However, the use of a long focal length also means that the image of an intruder close to the lens will not be focused on the pyroelectric detector. Hence, the narrow angle of coverage achieved by this approach (and the associated reduction in nuisance alarms) comes at the expense of poor detection performance (and in particular, the existence of blind spots) in regions close to the lens of the detector.

Other approaches aimed at solving this problem may utilize multiple pyroelectric detectors and sophisticated electronic circuitry to achieve a narrow detection zone. However, these approaches have the drawback of increased cost and complexity of the detector.

There is thus a need in the art for an infrared detector that overcomes the aforementioned infirmities. In particular, there is a need in the art for an infrared detector which has a reasonable focal length and minimal degradation in detection performance close to the lens, and which avoids some of the cost and complexity inherent in some approaches to achieving a narrow detection angle detector. These and other needs may be addressed by the devices and methodologies described herein.

DETAILED DESCRIPTION

As used herein, the term "aperture stop" refers to an element (in an infrared detector of the type described herein) which is placed in the optical path of a detector to modify the ray cone angle at an image point. This element may be, for example, a diaphragm or septum, or the edge of a lens or mirror.

In one aspect, an infrared detector is provided which comprises a pyroelectric detector having first and second sensing elements, an aperture stop, and a Fresnel lens array.

In another aspect, an infrared detector is provided which comprises a window; first and second sensing elements disposed on a first side of a window; an aperture stop disposed on a second side of a window; and a Fresnel lens array; wherein the Fresnel lens array has a finite focal length.

It has now been found that the aforementioned needs in the art may be met through the provision of an infrared motion detector which is equipped with a pyroelectric detector having an aperture stop disposed at, or near, a front window thereof. Such a detector may be configured as a compact, low-cost passive infrared detector unit for detecting intrusion into openings, such as store fronts, windows and doors, where there is a possibility of nuisance alarms due, for example, to the proximity of innocent foot traffic to the openings.

In a preferred embodiment, the detector employs a dual-element pyroelectric detector coupled with an aperture stop and a simple Fresnel lens array with a reasonable focal length. Such a configuration affords a narrow sheet of protection across an opening being protected, thereby minimizing the incidence of such nuisance alarms. Since the detector uses a lens array of reasonable focal length, degradation of detector performance near the lens is minimized. Moreover, the use of an aperture stop permits the detector to achieve a narrow sheet of protection with a single dual-element pyroelectric detector. While it might be possible to achieve a similar result through the use of multiple dual-element pyroelectric detectors and complicated circuitry, the infrared detectors described herein provide a comparatively less expensive and less complex solution to the aforementioned problems.

Figure 1:
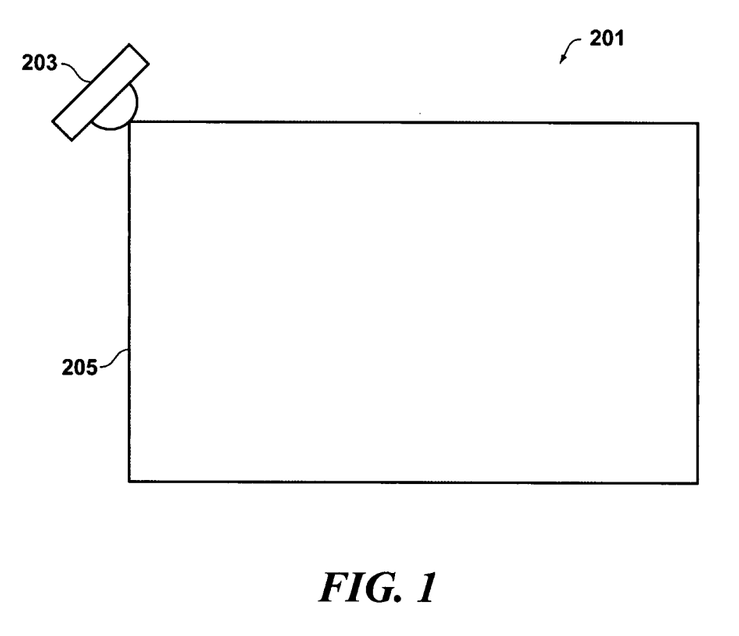
FIG. 1 is an illustration of the area protected by a passive, infrared (PIR) sensor.
Figure 2:
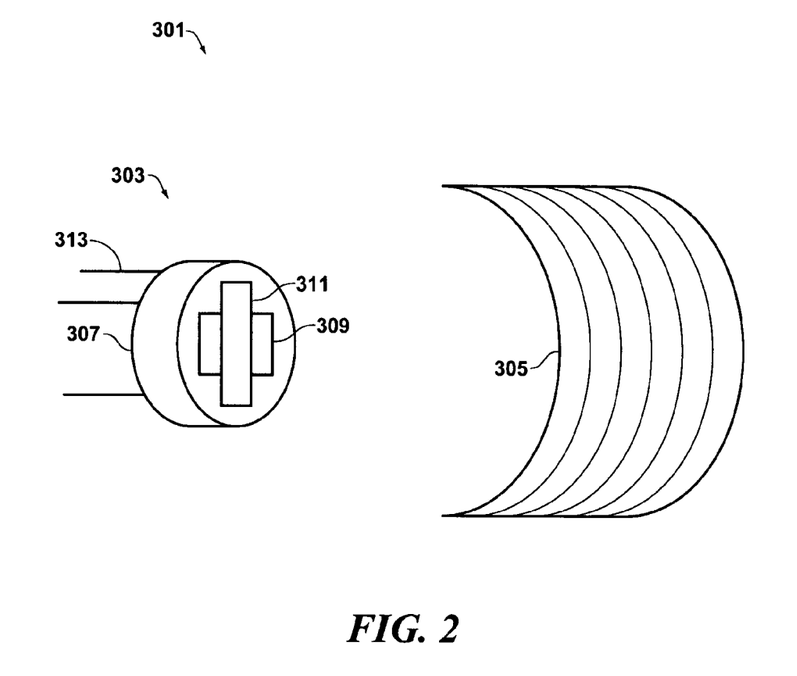
FIG. 2 is an illustration of an embodiment of an infrared detector in accordance with the teachings herein.
Figure 3:
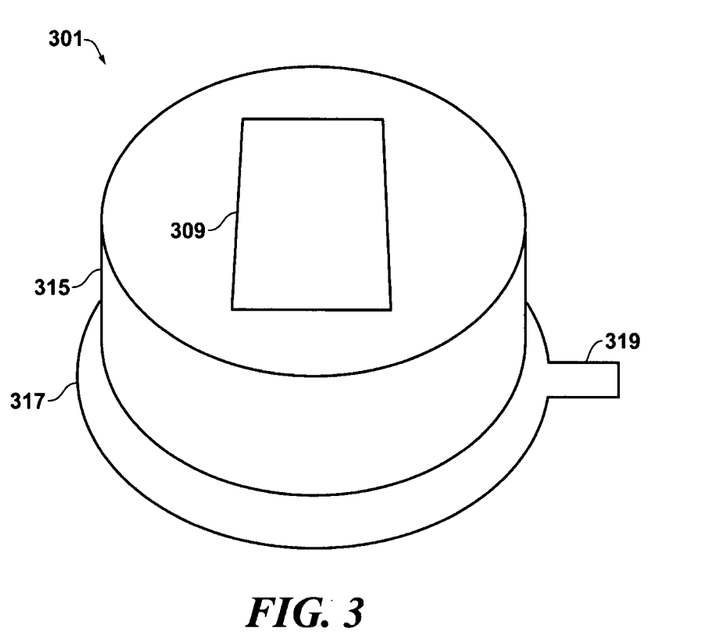
FIG. 3 is an illustration of a pyroelectric detector suitable for use in the infrared detectors disclosed herein.
Figure 4:
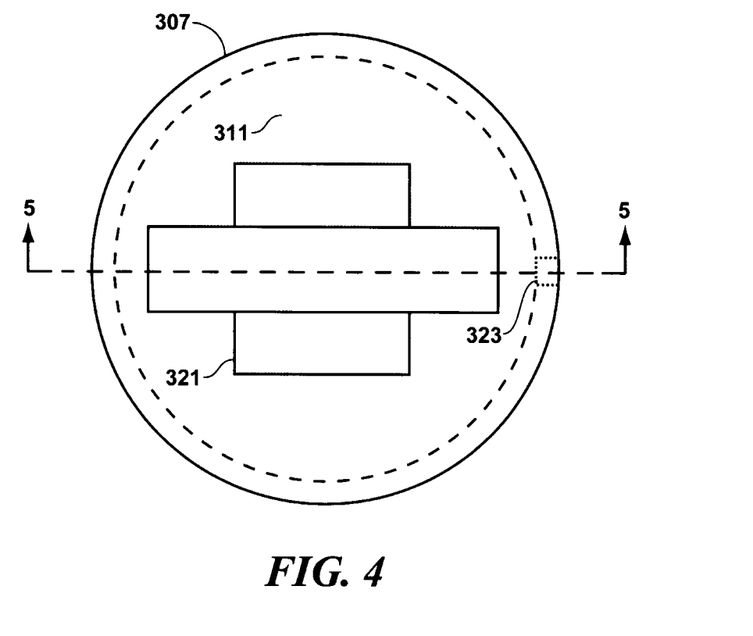
FIG. 4 is an illustration of a cap for a pyroelectric detector of the type disclosed herein.

Referring now to FIG. 1, a typical mode of deployment 201 of an infrared detector 203 of the type disclosed herein is depicted. As seen therein, the infrared detector 203 is mounted near one extreme of, and slightly ahead of, an opening or area 205 to be protected. In operation, the infrared detector 203 establishes a narrow sheet of protection for the detection of intrusion attempts into the protected area 205, while minimizing nuisance alarms.

The details of the infrared detector 203 depicted in FIG. 1 may be further appreciated with reference to the particular, non-limiting embodiment thereof which is illustrated in FIGS. 2-6 (for ease of illustration, certain elements of the infrared detector 203, such as the control circuitry, have been omitted). As seen therein, the infrared detector 301 comprises a (preferably low-cost) dual-element pyroelectric detector 303 which is positioned in opposing relation to a lens array 305. Suitable pyroelectric detectors 303 which may be used in such an embodiment include, for example, the LHi 878 pyroelectric infrared detector, which is available commercially from Perkin-Elmer Corporation, Fremont, Calif.

The pyroelectric detector 303 comprises a chassis or can 315 (see FIG. 2) having a plurality of lead wires 313 extending from one end thereof. The lead wires 313 provide power to the pyroelectric detector 303 and allow it to interface with control circuitry or devices. The opposing, operational end of the pyroelectric detector 303 is equipped with an infrared window 309 which, in this particular embodiment, has an aperture stop 311 mounted thereon.

Figure 6:
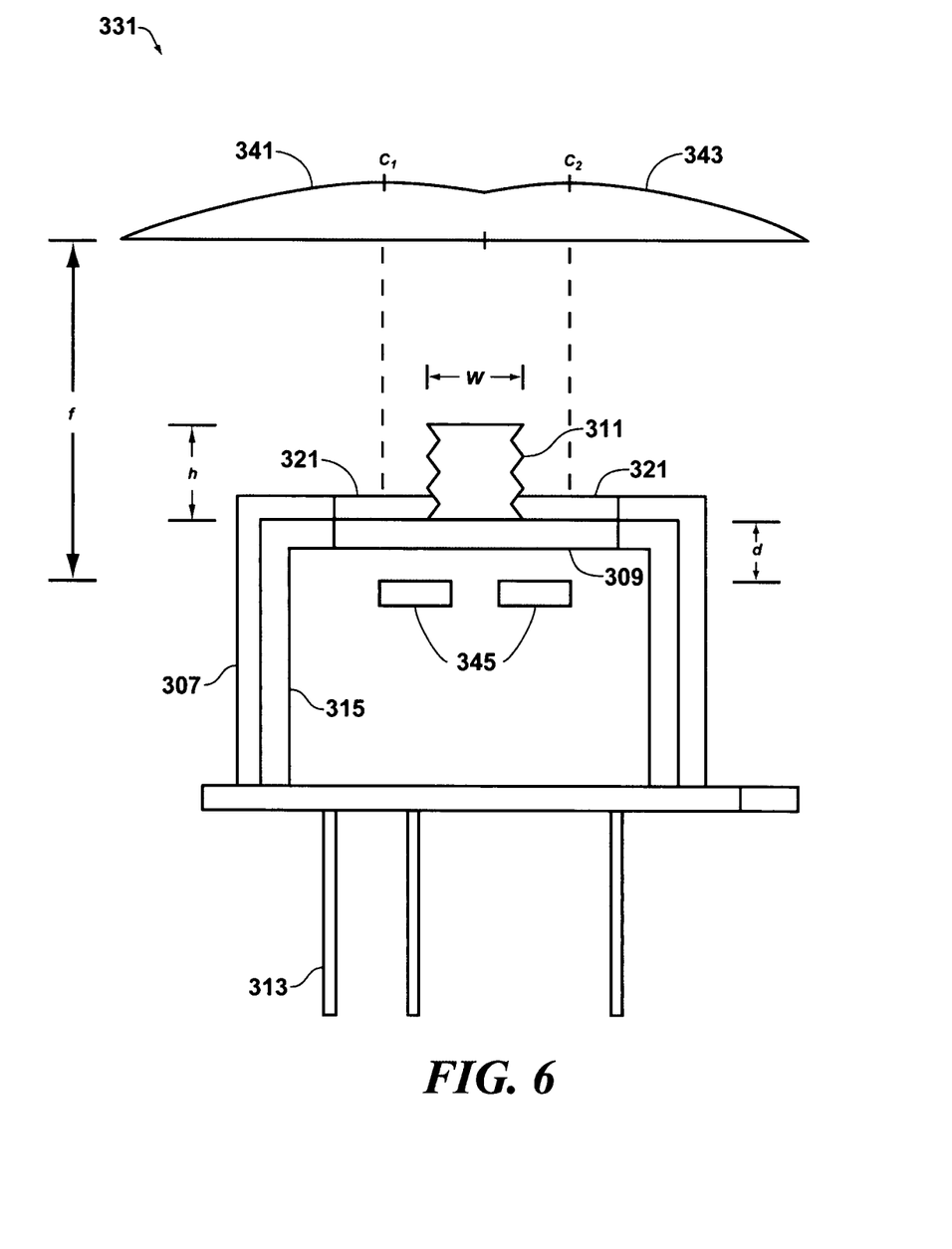
FIG. 6 is an illustration of a pyroelectric detector in accordance with the teachings herein.
Figure 7:
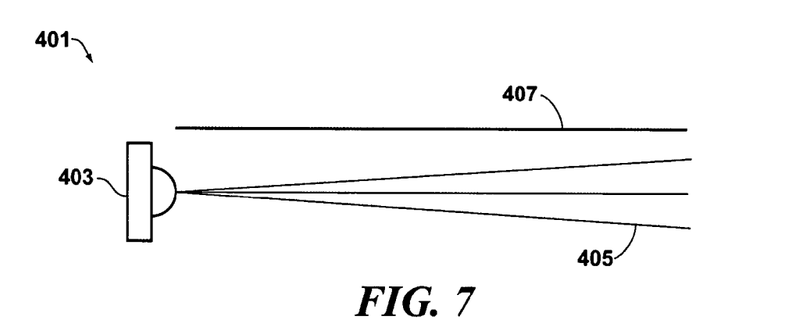
FIG. 7 is a top view illustration of the coverage area attainable with a pyroelectric detector of the type disclosed herein.
Figure 8:
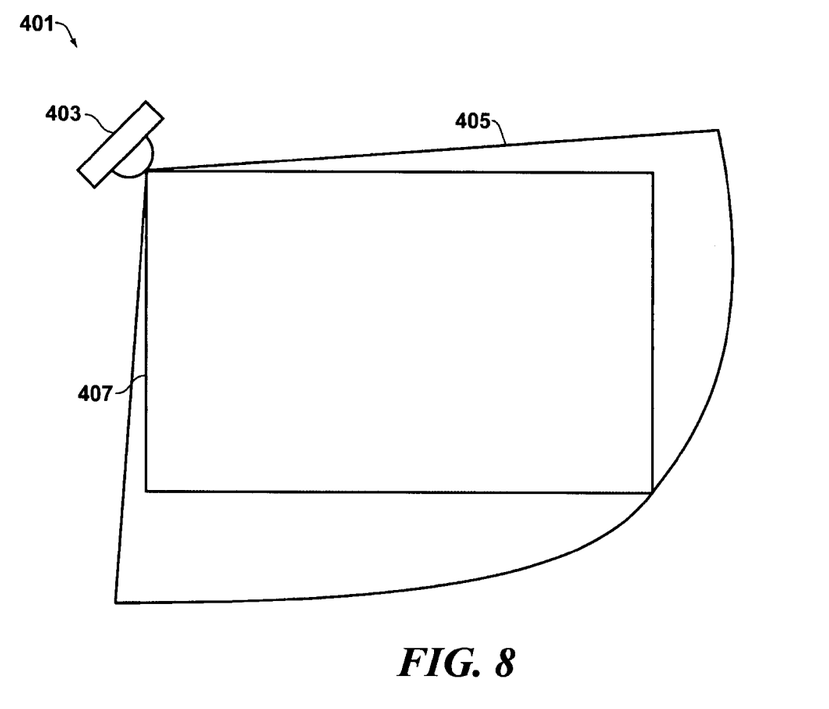
FIG. 8 is a front view illustration of the coverage area attainable with a pyroelectric detector of the type disclosed herein.

The aperture stop 311 is preferably approximately centered over the blank space between the sensitive elements 345 of the detector as indicated in FIG. 6. If the aperture stop 311 is small, the effect will also be small (that is, the coverage area will be wider than desired). If the aperture stop is large, there is a danger that tolerance buildups will cause one of the pyroelectric detector's sensitive elements to be completely blocked, preventing the effect. In a preferred embodiment, the aperture stop 311 is a strip of material which is opaque to the 8 to 14 µm region of the spectrum and which is positioned perpendicular to the long direction of the sensitive elements 345 (see FIG. 4).

The aperture stop in this embodiment may have any suitable width (w) (see FIG. 6), but preferably has a width that is within the range of more than 1 but less than 3 mm, and more preferably, within the range of about 2.25 to about 2.75 mm. Most preferably, the width of the aperture stop 311 is about 2.5 mm. The aperture stop 311 may also be of any suitable thickness.

Figure 5:
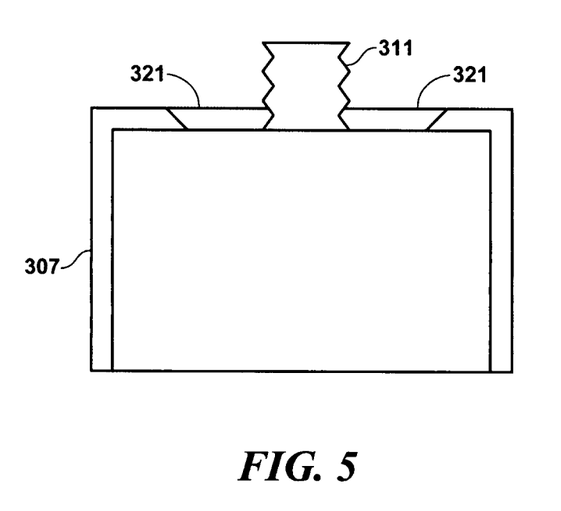
FIG. 5 is a cross-sectional view of the cap of FIG. 4 taken along LINE 5-5.

If the aperture stop has any appreciable thickness, the sides of the aperture stop 311 are preferably roughened as shown in FIGS. 5-6 to minimize the quantity of infrared electromagnetic radiation reflected from the sides of the aperture stop 311 that reaches the pyroelectric detector 303 (in this respect, it is to be noted that such reflections are undesirable in that they can effectively widen the angle of protection). Such roughening may be achieved by molding grooves or protrusions into the sides of the aperture stop 311, by coating the sides of the aperture stop 311 with a composition comprising a suitable particulate matter of appropriate particle size disposed in a polymeric matrix, or by chemically roughening this surface through treatment with a solvent or etchant. In some embodiments, the sides of the aperture stop 311 may be treated with a composition that absorbs or diffusely scatters infrared radiation.

The aperture stop 311 may comprise various metals or metal alloys, including, for example, aluminum or stainless steel. The aperture stop 311 may also comprise various plastics which are suitably opaque to infrared wavelengths, including, for example, various acrylics, polycarbonates, or ABS, in which case the aperture stop 311 may be formed by injection molding or through other suitable techniques as are known to the art. The aperture stop 311 may also be made of other non-metal, non-plastic materials that are opaque in the thermal infrared, such as glass. The aperture stop 311 may also be equipped on one surface with an adhesive with which it may be applied to one surface of the pyroelectric detector's window 309 or can 315.

The construction of the infrared detector 301 with an injection molded aperture stop held to the pyroelectric detector 303 by one form of integral alignment may be understood with reference to FIGS. 3-6. As seen therein, the infrared detector 301 has a pyroelectric detector 303 that is fitted with a cylindrical sheath 307 which slidingly engages, and which is complimentary in shape to, the chassis 315 or "can" of the pyroelectric detector 303. The sheath has two through holes 321 that admit thermal infrared radiation. The sheath 307 is equipped with a notch 323 that keys to a tab 319 provided on the chassis 315. This arrangement ensures that the aperture stop 311 will be properly oriented over the window 309 of the pyroelectric detector 303. The chassis 315 is generally a TO-5 metal can, while the sheath 307 may also comprise metal or a suitable plastic.

Referring now to FIG. 6, it will be appreciated that it may be advantageous in some embodiments of the infrared detectors disclosed herein to make the aperture stop 311 of sufficient height so that it effectively blocks all or most infrared electromagnetic radiation which is intended for one of the sensitive elements 345 from reaching the other element. In a common pyroelectric detector design, the sensitive elements 345 are recessed behind a window 309 of silicon or another infrared transmitting material and are disposed within the interior of the chassis 315. Typically, the sensitive elements 345 are recessed at an optical distance d of approximately 0.8 mm, have a width of 1 mm, and are spaced 1 mm apart.

As shown in FIG. 6, the aperture stop 311 of the pyroelectric detector/aperture stop combination has a width w and a height h, and the focal length of the lenslets 341, 343 in the lens array 331 is f. To prevent all rays from one lenslet reaching the sensitive element associated with the other lenslet, the following inequality applies:

$$\frac{3-w}{2(h+d)} < \frac{3}{f} \quad \text{(INEQUALITY 1)}$$

It follows from INEQUALITY 1 that the height h of the strip should be in accordance with the following inequality:

$$h > \sim \frac{f}{2} - d - \frac{wf}{6} \quad \text{(INEQUALITY 2)}$$

However, the elimination of all rays is not strictly necessary, so that the height of the aperture stop can be less than INEQUALITY 2 requires.

Referring again to FIG. 6, the lens array 331 consists of two cylindrical lenslets 341 and 343 which are of approximately the same focal length, and which are disposed with their cylindrical axes parallel to the longitudinal axis of the sensitive elements 345 of the pyroelectric detector. It will be appreciated that, in this orientation, the cylindrical axes of the lenslets 341 and 343 will be parallel to the plane of protection. If a pyroelectric detector 303 is used which does not have a longitudinal axis, then the cylindrical axes of the lenslets 341 and 343 should still be parallel to the plane of protection. The cylindrical axis of each lenslet 341 and 343 is positioned directly ahead of the outside edge of the sensitive area 345 of the pyroelectric detector 303, one on each side.

Several variations of the embodiment depicted in FIGS. 2-6 are possible. For example, in some embodiments, the angular coverage in the plane of protection provided by the infrared detector may be extended, if desired, through the addition of annular lens segments arranged with their optical centers off of the physical borders of the lenslet. The resulting device can be made to mimic a cylindrical lens whose optical properties extend beyond the boundaries of the physical lens.

Figure 13:
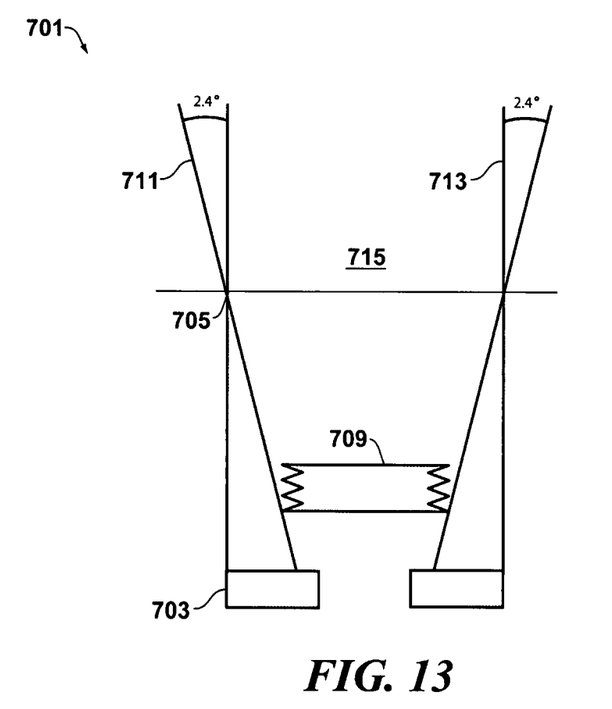
FIG. 13 is a ray tracing of a pyroelectric detector equipped with a strip that is opaque to infrared electromagnetic radiation.
Figure 14:
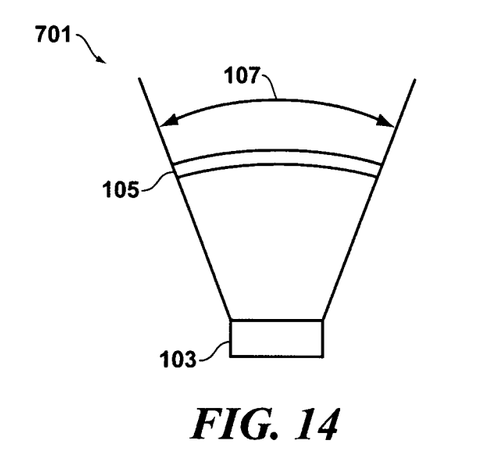
FIG. 14 is a cross-sectional side view of a sense element for a pyroelectric detector giving rise to the ray tracing shown in FIG. 13.

FIGS. 13-14 depict the resulting protection pattern afforded by an infrared detector 301 of the type depicted in FIGS. 2-6. The example shown in FIGS. 13-14 represents the protection pattern generated with an infrared detector which utilizes cylindrical lenses having a focal length of 6 mm, and which produces a pattern 4.8° wide with a transition from a negative to a positive signal at the approximate center of the pattern. It will be appreciated that practical devices might use a longer focal length. Hence, a focal length of 20 mm would be needed to give a total angle of approximately 1.4°, corresponding to a barrier which is 20 cm wide at a distance of 8 meters. While the optimum focal length can vary depending on the particular application and area to be protected, in a typical situation, the focal length will be less than 50 mm, and preferably, will be within the range of about 10 to about 35 mm. More preferably, the focal length will be within the range of about 15 to about 32 mm.

Figure 9:
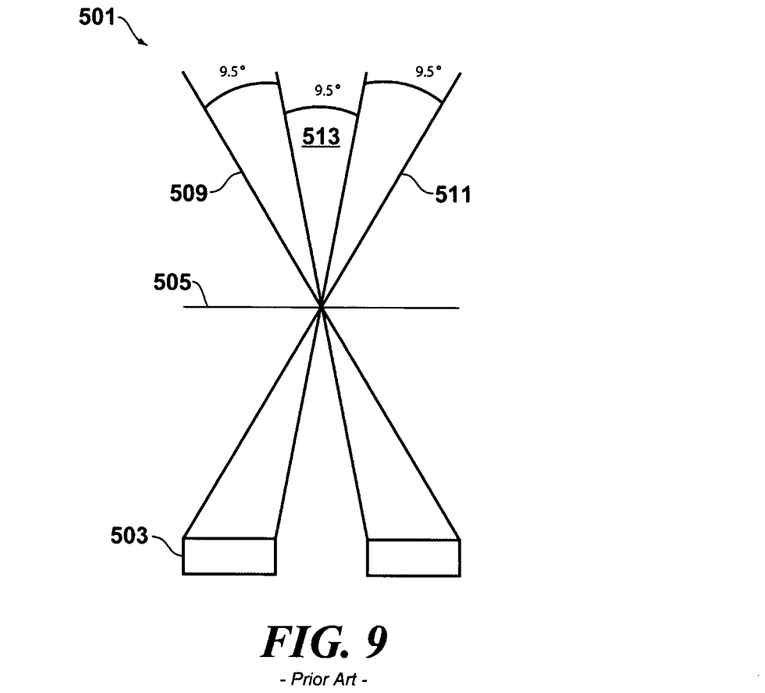
FIG. 9 is a ray tracing of a pyroelectric detector equipped with a lens.
Figure 10:
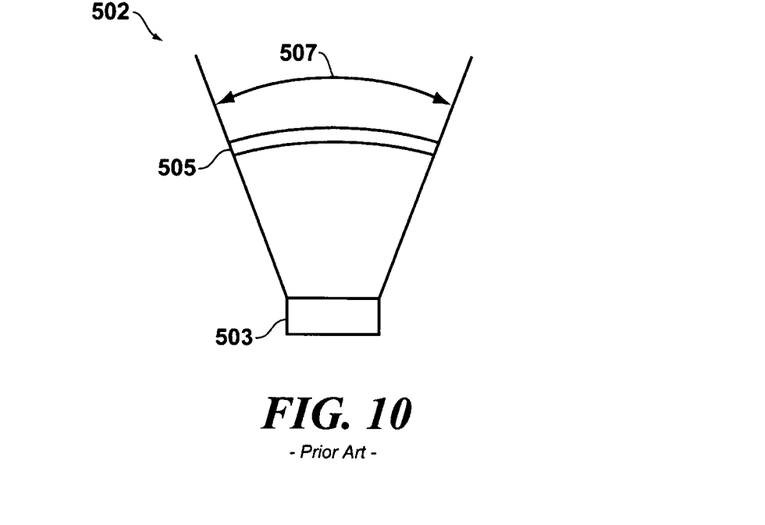
FIG. 10 is a cross-sectional side view of a sense element for a pyroelectric detector giving rise to the ray tracing shown in FIG. 9.

FIG. 9 shows the protection pattern 501 afforded by a conventional single cylindrical lens infrared detector 502 (shown in FIG. 10) which is devoid of an aperture stop. The lens 502 has the same focal length as each of the two cylindrical lenses 505 ahead of a conventional dual-element 503 pyroelectric detector in the previous example. Each element 503 of the detector is approximately 1 mm×2 mm. For a focal length of 6 mm, the pattern consists of two "fingers" 509, 511 of opposite polarity, each approximately 9.5 degrees wide, and separated by a "dead zone" 513 approximately 9.5 degrees wide.

Figure 11:
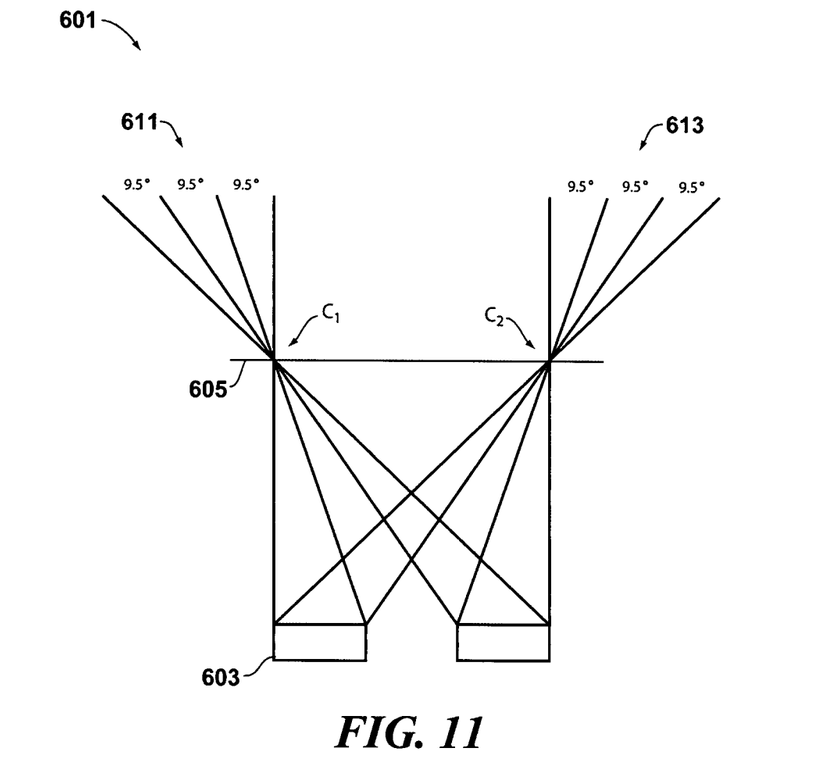
FIG. 11 is a ray tracing of a pyroelectric detector equipped with a lens array.
Figure 12:
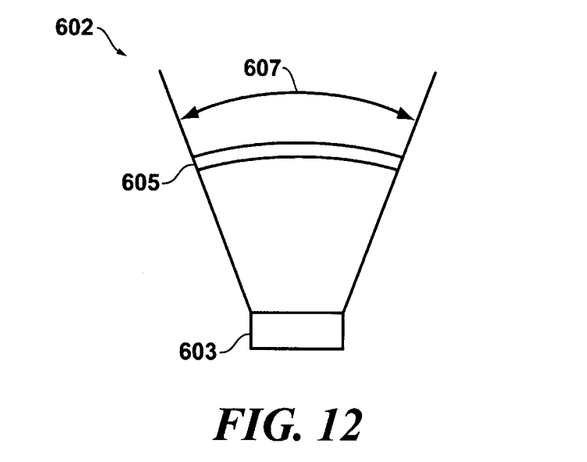
FIG. 12 is a cross-sectional side view of a sense element for a pyroelectric detector giving rise to the ray tracing shown in FIG. 11.

FIG. 11 shows the protection pattern 601 afforded by a conventional dual-element pyroelectric detector 602 (shown in FIG. 12). The detector 602 is devoid of an aperture stop, and is equipped with a lens array 605 having two cylindrical lenslets 607, 609. The resulting protection pattern 601 has first and second optical centers $C_1$ and $C_2$, and consists of first 611 and second 613 groups of "fingers" of opposite polarity, each finger being approximately 9.5 degrees wide, and each group 611 and 613 of fingers being associated with one of the elements 603 of the detector 602.

As seen from the protection pattern 601, the use of such a lens array 605 has eliminated the "dead zone" 513 present in the protection pattern of FIG. 9, but for a trivial non-diverging "dead zone" 3 mm wide. Consequently, the pattern is now 19° wide, with a transition from a negative to a positive signal at the approximate center of the pattern. Taking into account the pattern due to imaging the opposite sensitive element 603, the total protection pattern 601 is 57° wide.

FIG. 13 illustrates the protection pattern 701 afforded by the lens array ahead of a dual-element pyroelectric detector 702 equipped with an aperture stop 709 in accordance with the teachings herein (in this particular embodiment, the aperture stop 709 is a thin, infrared-opaque strip). The detector 702 is equipped with a lens array 705 having two cylindrical lenslets 707, 709. The resulting protection pattern 701 consists of two "fingers" 711, 713 of opposite polarity. For the 6 mm focal length example, the pattern 701 is now only 4.8° wide, plus the trivial 3 mm constant-width "dead zone" 715. For longer focal lengths, there is a possibility that each of the sensitive elements 703 may have some energy imaged onto it from the opposite lenslet; hence the thick aperture stop discussed earlier.

Figure 15:
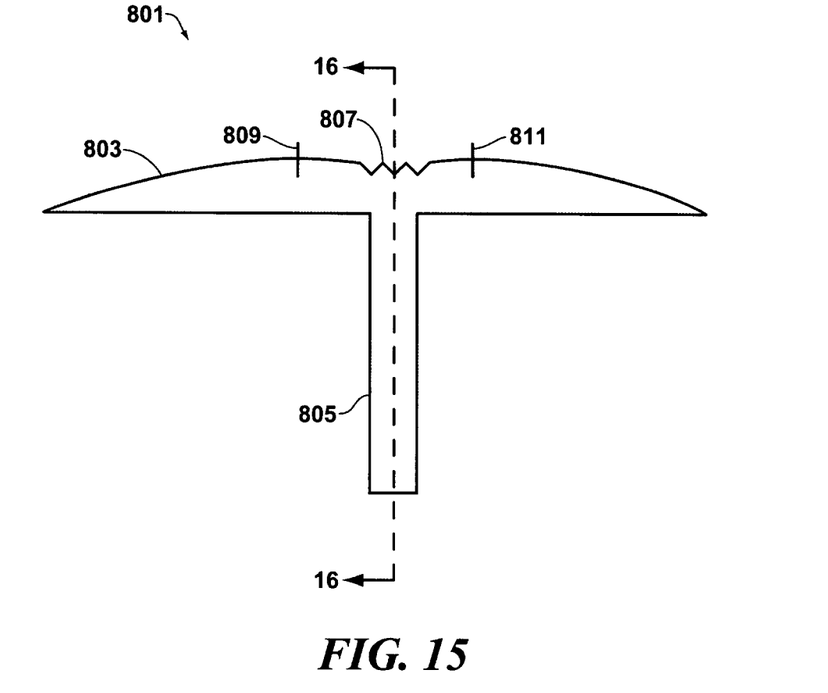
FIG. 15 is a cross-sectional illustration of a lens array of the type disclosed herein which is equipped with a septum.
Figure 16:
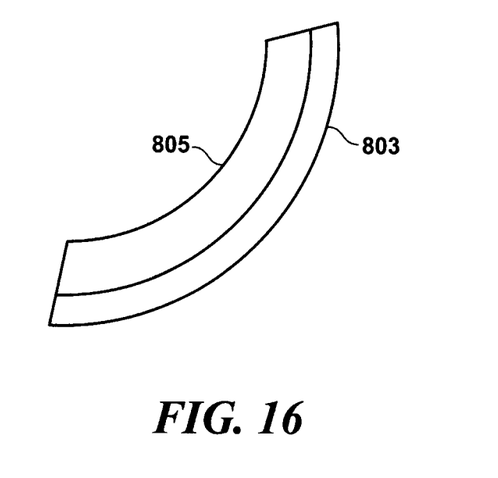
FIG. 16 is a view taken along LINE 16-16 of FIG. 15.

FIGS. 15-16 depict a particular, non-limiting embodiment of a lens array 801 useful in the devices and methodologies described herein. The lens array 801 depicted therein comprises first 803 and second 805 lenslets and is constructed such that the area between the two cylindrical lens centers 807 and 809 is rendered opaque or scattering to infrared wavelengths. This may be achieved, for example, by running a septum 811 of infrared opaque material from the lens array 801 toward the pyroelectric detector, or by incorporating a diffusing section 813 between the two lens centers 807 and 809 consisting of, for example, short focal length cylindrical lenses with their cylindrical axis running perpendicular to the cylindrical axis of first 803 and second 805 cylindrical lenslets. This step may be necessary if the aperture stop is thin and the focal length is long. The septum 811 has the additional advantage of stiffening the lens array 801.

The lens array 801 can consist of ordinary cylindrical (or acylindrical) lenses, provided that their material is sufficiently transparent to infrared radiation to allow the required thickness at the optical centers. The lens array 801 can also consist of two rows of ordinary spherical (or aspherical) lenses with their optical centers spaced approximately the length of the long dimension of the pyroelectric detector elements (with the same thickness caution as above), or may consist of cylindrical (or acylindrical) Fresnel lenses or rows of spherical (or aspherical) Fresnel lenses. The rows of spherical or aspherical lenses constitute synthetic cylindrical (or acylindrical) lenses. In some embodiments, the angular coverage can be extended beyond the endpoints of the cylindrical or acylindrical lenses or synthetic lenses through the use of off-axis spherical or aspherical lenses with their optical centers in line with the other optical centers and beyond the extent of the lens array.

In light of the foregoing, it will be appreciated that the protection pattern may be narrowed through the use of the devices and methodologies disclosed herein in one or more of the following three ways:

(1) The central "dead zone" may be narrowed arbitrarily close to zero through the use of two cylindrical lenses with parallel axes located ahead of the extremes of the sensitive area;

(2) The remainder of the pattern may be narrowed by obscuring a portion of each of the two sensitive elements of the pyroelectric detector of the example; and (3) Other artifacts contributing to a wider pattern (the image of one sensitive element of the pyroelectric detector through the cylindrical lens whose cylindrical axis is ahead of the other sensitive element) may be eliminated by the use of a thick aperture stop on top of the pyroelectric detector as shown, for example, in FIG. 6, and/or by adding a septum between the two cylindrical lenses.

In the most preferred embodiment, the lens array is an array of two cylindrical or acylindrical plano convex Fresnel lenses. The material of the lens array is preferably high-density polyethylene, but could also be any material transparent to thermal infrared radiation. From an optical design standpoint, it is preferable that the grooved side of the lens array faces away from the pyroelectric detector, although other considerations may dictate that the grooved side should face the pyroelectric detector so that a smooth (piano) surface faces the protected area. The lens array is preferably curved at approximately its focal length (as measured when curved) about the pyroelectric detector, and the pyroelectric detector itself is preferably a common dual-element type detector packaged in a TO-5 metal can.

The aperture stop is preferably in the form of a strip which is opaque to infrared radiation, and is preferably incorporated into an injection molded cap with a cylindrical portion that fits over the TO-5 package and that has a notch for alignment with the tab on the TO-5 package. The strip is preferably 2.5 mm wide, has a height approximately equal to or in excess of f/2−d−wf/6 mm high (see INEQUALITY 2), and has sides that are roughened or angled to avoid reflecting unwanted rays onto the sensitive elements of the pyroelectric detector.

It will be appreciated that the pyroelectric detectors disclosed herein may have various other features and elements as are known to the art. These include, for example, suitable electronics to operate the device and to generate an alarm signal when intrusion is detected, a suitable power source, and a suitable housing to protect or enclose the detector.

It will further be appreciated that, while the use of dual element pyroelectric detectors is preferred in some embodiments of the devices and methodologies described herein, pyroelectric detectors having more than two elements may also be utilized. A particular, non-limiting embodiment of such a device is depicted in FIGS. 17-18.

Figure 17:
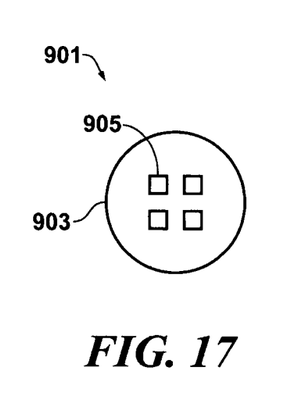
FIG. 17 is a schematic illustration of a quad element pyroelectric detector.

With reference to FIG. 17, a quad-element pyroelectric detector 901 is depicted which is equipped with a housing 903 having four sensing elements 905 disposed therein. In the particular embodiment depicted, the sensing elements 905 are 1 mm×1 mm in size and are spaced 1 mm apart from each other, though it will be appreciated that the dimensions of these sensing elements 905 may vary from one device or end use to another.

Figure 18:
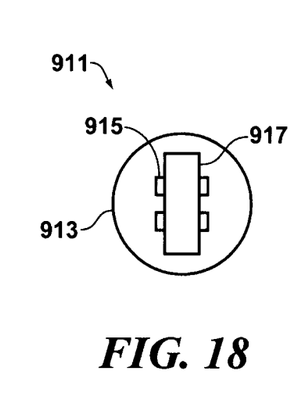
FIG. 18 is a schematic illustration of a quad element pyroelectric detector with a masking element.

The device 911 of FIG. 18 is similar to the device of FIG. 17 and also has a housing 913 with four sensing elements 915 disposed therein, but has been further modified in accordance with the teachings herein through the provision of a septum 917 or other masking element. This device functions in an analogous manner to the device 303 of FIG. 2.

It will also be appreciated that various dispositions of the septum or septa are possible in the devices and methodologies described herein. Two such dispositions are illustrated in FIGS. 19 and 20.

Figure 19:
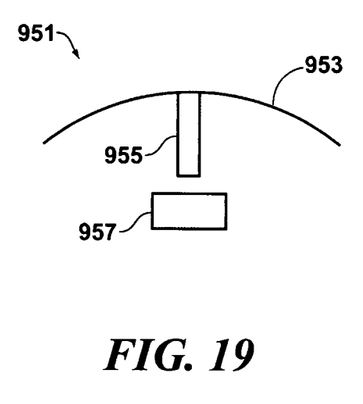
FIG. 19 is an illustration of a pyroelectric detector with a septum disposed downward from the lens.

With reference to FIG. 19, the device 951 depicted therein comprises a lens 953 having a septum 955 which is disposed downward from the lens 953 and toward the detector 957. Preferably, the septum 955 in this type of embodiment forms an integral part of the lens 953 and hence, these two elements may be molded as a single construct. An example of this type of embodiment is depicted in FIG. 15.

Figure 20:
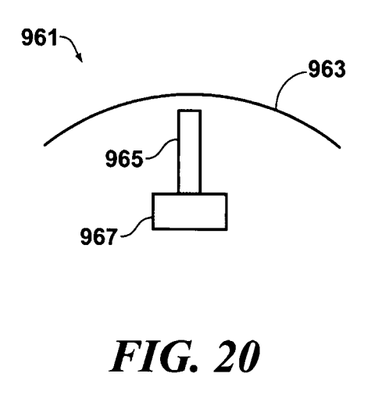
FIG. 20 is an illustration of a pyroelectric detector with a septum disposed downward from the lens.

With reference to FIG. 20, the device 961 depicted therein comprises a lens 963 having a septum 965 which is disposed upward from the detector 967. The septum 965 in this type of embodiment may form part of a "hat" of the type which may be used for a thin aperture stop in some embodiments made in accordance with the teachings herein.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. An infrared detector, comprising:
a pyroelectric detector equipped with a window and having first and second sensing elements disposed on a first side of said window;
an aperture stop disposed on a second side of said window, wherein said aperture stop has first and second opposing sides which diffusely reflect infrared electromagnetic radiation; and
a Fresnel lens array disposed on said second side of said window, wherein said Fresnel lens array has a focal length of less than about 50 mm.

2. The infrared detector of claim 1, wherein said Fresnel lens array has a focal length within the range of about 10 mm to about 40 mm.

3. The infrared detector of claim 1, wherein said Fresnel lens array has a focal length within the range of about 15 mm to about 30 mm.

4. The infrared detector of claim 1, wherein said aperture stop is disposed between, and in front of, said first and second sensing elements.

5. The infrared detector of claim 1, wherein said aperture stop is a septum.

6. The infrared detector of claim 1, wherein said aperture stop has first and second opposing sides which are equipped with a plurality of ridges which diffusely reflect infrared electromagnetic radiation.

7. The infrared detector of claim 1, wherein said first and second sensing elements are disposed behind said window and within a chassis.

8. The infrared detector of claim 7, wherein said aperture stop is disposed in front of said window.

9. The infrared detector of claim 8, wherein the minimum distance between said window and said first sensing element is d, wherein the aperture stop has a mean width w and extends a height h above said window, wherein said Fresnel lens array has a focal length f, and wherein $$h > \sim \frac{f}{2} - d - \frac{wf}{6}.$$

10. The infrared detector of claim 1, wherein the infrared detector passively receives radiation.

11. An intrusion detection system incorporating the infrared detector of claim 1.

12. The infrared detector of claim 1, wherein said aperture stop and said Fresnel lens array form an integral construct.

13. The infrared detector of claim 1, wherein said aperture stop is detached from said Fresnel lens array.

14. The infrared detector of claim 13, wherein said aperture stop is in contact with said pyroelectric detector.

15. The infrared detector of claim 14, wherein said aperture stop is disposed upon said window.

16. The infrared detector of claim 1, wherein said pyroelectric detector has more than two sensing elements.

17. The infrared detector of claim 1, wherein said Fresnel lens array is an array of two cylindrical plano convex Fresnel lenses.

18. The infrared detector of claim 1, wherein said Fresnel lens array is an array of two acylindrical plano convex Fresnel lenses.

19. The infrared detector of claim 1, wherein said Fresnel lens array comprises a polymeric material.

20. An infrared detector, comprising:
a window having first and second major surfaces;
first and second sensing elements disposed on a first side of said window;
an aperture stop disposed on a second side of said window, wherein said aperture stop has first and second opposing sides which diffusely reflect infrared electromagnetic radiation; and
a Fresnel lens array disposed on said second side of said window;
wherein said Fresnel lens array has a finite focal length, wherein said Fresnel lens has a focal length of less than about 50 mm.

21. The infrared detector of claim 20, wherein said first and second sensing elements are disposed on a first side of said first major surface, and wherein said aperture stop and said Fresnel lens array are disposed on a second side of said first major surface.

22. The infrared detector of claim 20, wherein said Fresnel lens has a focal length within the range of about 10 mm to about 40 mm.

23. The infrared detector of claim 20, wherein said Fresnel lens has a focal length within the range of about 15 mm to about 30 mm.

24. The infrared detector of claim 20, wherein said aperture stop is disposed between, and in front of, said first and second sensing elements.

25. An infrared detector, comprising:
a pyroelectric detector equipped with a window and having first and second sensing elements disposed on a first side of said window;
an aperture stop disposed on a second side of said window, wherein said aperture stop has first and second opposing sides which diffusely reflect infrared electromagnetic radiation; and
a Fresnel lens array disposed on said second side of said window, wherein said Fresnel lens array has first and second optical centers;
wherein said sensing elements have interior edges which are closest to each other, and exterior edges which are farthest from each other, wherein said first optical center is over the exterior edge of said first sensing element, and wherein said second optical center which is over the exterior edge of said second sensing element.

26. The infrared detector of claim 25, wherein said Fresnel lens array has a focal length of less than about 50 mm.

* * * * *